United States Patent [19]

Ohashi et al.

[11] Patent Number: 5,254,618
[45] Date of Patent: Oct. 19, 1993

[54] TREAD RUBBER COMPOSITIONS FOR HEAVY DUTY PNEUMATIC TIRE

[75] Inventors: Masayuki Ohashi; Hiroshi Yamada, both of Kodaira, Japan

[73] Assignee: Bridgestone Corporation, Tokyo, Japan

[21] Appl. No.: 796,847

[22] Filed: Nov. 25, 1991

[30] Foreign Application Priority Data

Nov. 26, 1990 [JP] Japan .................. 2-317867

[51] Int. Cl.$^5$ .............................. C08K 3/04
[52] U.S. Cl. ................... 524/495; 524/496
[58] Field of Search .................. 524/495, 496

[56] References Cited

U.S. PATENT DOCUMENTS 4,703,079 10/1987 Ahmad et al. ............... 524/496

FOREIGN PATENT DOCUMENTS 0159469 10/1985 European Pat. Off. .
2635108  2/1990 France .
2638757  5/1990 France .
91/13944 9/1991 World Int. Prop. O. .

Primary Examiner—Paul R. Michl
Assistant Examiner—Edward Cain
Attorney, Agent, or Firm—Sughrue, Mion, Zinn, Macpeak & Seas

[57] ABSTRACT

A tread rubber composition for heavy duty pneumatic tire comprises a particular amount of a particular carbon black satisfying CTAB of 130–160 m$^2$/g, DBP of 90–120 m/100 g and Dm of not more than 210 Å, based on 100 parts by weight of at least one rubber component.

4 Claims, No Drawings

TREAD RUBBER COMPOSITIONS FOR HEAVY DUTY PNEUMATIC TIRE

BACKGROUND OF THE INVENTION

Field of the Invention

This invention relates to a tread rubber composition for heavy duty pneumatic tire, and more particularly to a rubber composition having excellent wear resistance and fatigue resistance and low heat build-up and used in a tread for heavy duty pneumatic tire running on bad road.

Description of the Related Art

Heretofore, carbon blacks of ISAF grade have been used as a filler for tread rubber having a high reinforcing property from a viewpoint of the wear resistance, fatigue resistance and low heat build-up.

Furthermore, carbon blacks of SAF grade have partially used in order to improve the wear resistance.

Moreover, it has been known that carbon blacks having a fine particle size and a high structure are generally suitable for improving the wear resistance of the tire tread.

However, as the particle size of carbon black is made finer, the low heat build-up is considerably degraded to lower the durability of the tire, while as the structure of carbon black becomes high, the wear resistance is good, but the fatigue resistance is undesirably degraded.

Furthermore, when such a carbon black is compounded with a rubber composition, the viscosity of the compounded rubber undesirably rises and hence the processing of rubber becomes difficult.

SUMMARY OF THE INVENTION

It is, therefore, an object of the invention to provide a tread rubber composition for heavy duty pneumatic tire capable of improving the wear resistance and fatigue resistance and low heat build-up without causing the aforementioned problems.

The inventors have made various studies with respect to colloidal properties of carbon black in order to solve the above problems and found that these problems can be solved by compounding a particular carbon black with a rubber composition and as a result the invention has been accomplished.

According to the invention, there is the provision of a tread rubber composition for heavy duty pneumatic tire comprising 30–100 parts by weight of carbon black satisfying the following conditions:

(1) cetyl trimethyl ammonium bromide adsorption specific surface area (CTAB) is within a range of 130–160 $m^2/g$;
(2) dibutylphathalate absorption (DBP) is within a range of 90–120 ml/100 g; and
(3) average void size of aggregate (Dm) is not more than 210 Å, based on 100 parts by weight of at least one rubber component selected from natural rubber and diene series rubbers.

DESCRIPTION OF THE PREFERRED EMBODIMENTS

As the diene series synthetic rubber used in the invention, mention may be made of isoprene rubber, butadiene rubber, butyl rubber, styrene-butadiene copolymer rubber and the like, but the invention is not limited to these rubbers.

Of course, additives usually used in rubber industry such as sulfur, vulcanization accelerator, accelerator activator, antioxidant and the like may properly be compounded with the rubber composition according to the invention.

Among the characteristics of carbon black according to the invention, CTAB is a value measured according to a method of ASTM D 3765-89, and DBP is a value measured according to a method of JIS K 6221-1982.

Moreover, Dm is an average void size giving a maximum differential void volume when mercury is pressed into carbon black sample from 16 psi to 30000 psi through a mercury porosimeter made by Micrometrix Co., Ltd. (trade name: Pore Sizer 9310) to measure a void size of aggregate and then a curve of void volume distribution is plotted from the measured void sizes of aggregates.

The carbon black according to the invention can be produced by using an oil furnace for hard series carbon black and controlling combustion conditions in the furnace and residence time of resulting carbon black flow inside the furnace.

The ranges of the characteristics of the carbon black used in the invention are defined as follows.

When CTAB is less than 130 $m^2/g$, the wear resistance considerably lowers, while when it exceeds 160 $m^2/g$, the low heat build-up is largely degraded, so that CTAB is required to be within a range of 130–160 $m^2/g$.

When DBP is less than 90 ml/100 g, the wear resistance considerably lowers and the sufficient dispersibility of carbon black is not obtained, while when it exceeds 120 ml/100 g, the cut resistance and fatigue resistance are degraded. Therefore, DBP is required to be within a range of 90–120 m/100 g. Preferably, DBP is within a range of 90–100 m/100 g.

When Dm is more than 210 Å, the fatigue resistance is considerably poor, and even if the value of DBP is within the range defined in the invention, the large degradation of the fatigue resistance is caused. Therefore, Dm is required to be not more than 210 Å. Preferably, Dm is not more than 200 Å.

When the amount of carbon black is less than 30 parts by weight, the sufficient wear resistance is not obtained, while when it exceeds 100 parts by weight, the viscosity of the rubber composition undesirably rises and the operability is considerably degraded.

The following examples are given in illustration of the invention and are not intended as limitations thereof.

The following Table 1 shows values of characteristics of carbon black used in this example.

TABLE 1

| Kind of carbon black | CTAB ($m^2/g$) | DBP (ml/100 g) | Dm (Å) | Remarks |
|---|---|---|---|---|
| A | 133 | 92 | 191 | Invention |
| B | 145 | 120 | 209 | products |
| C | 158 | 114 | 206 | |
| D | 122 | 91 | 240 | Comparative |
| E | 168 | 126 | 209 | products |
| F | 144 | 121 | 234 | |
| G | 154 | 65 | 180 | |
| H | 142 | 95 | 218 | |

The carbon blacks A–C shown in Table 1 are those according to the invention, and the carbon blacks D–H are those used for the comparison.

The comparative carbon blacks have the following characteristics.

Moreover, Example 4 was compared with Comparative Example 6.

TABLE 2

|  | Example 1 | Example 2 | Example 3 | Comparative Example 1 | Comparative Example 2 | Comparative Example 3 | Comparative Example 4 | Comparative Example 5 | Example 4 | Comparative Example 6 |
| --- | --- | --- | --- | --- | --- | --- | --- | --- | --- | --- |
| Compounding recipe |  |  |  |  |  |  |  |  |  |  |
| natural rubber | 100 | 100 | 100 | 100 | 100 | 100 | 100 | 100 | 80 | 80 |
| styrene-butadiene rubber *1 | — | — | — | — | — | — | — | — | 20 | 20 |
| carbon black (kind) | 45 (A) | 45 (B) | 45 (C) | 45 (D) | 45 (E) | 45 (F) | 45 (G) | 45 (H) | 45 (A) | 45 (F) |
| stearic acid | 2.0 | 2.0 | 2.0 | 2.0 | 2.0 | 2.0 | 2.0 | 2.0 | 2.0 | 2.0 |
| ZnO | 3.0 | 3.0 | 3.0 | 3.0 | 3.0 | 3.0 | 3.0 | 3.0 | 3.5 | 3.5 |
| antioxidant (IPPD) *2 | 1.0 | 1.0 | 1.0 | 1.0 | 1.0 | 1.0 | 1.0 | 1.0 | 1.0 | 1.0 |
| vulcanization acculator (CZ) *3 | 1.0 | 1.0 | 1.0 | 1.0 | 1.0 | 1.0 | 1.0 | 1.0 | 1.4 | 1.4 |
| sulfur | 1.5 | 1.5 | 1.5 | 1.5 | 1.5 | 1.5 | 1.5 | 1.5 | 1.0 | 1.0 |
| Properties |  |  |  |  |  |  |  |  |  |  |
| wear resistance (index) | 103 | 105 | 103 | 81 | 102 | 100 | 63 | 87 | 102 | 100 |
| fatigue resistance (index) | 117 | 113 | 113 | 108 | 104 | 100 | 104 | 106 | 115 | 100 |
| heat build-up (index) | 110 | 101 | 103 | 107 | 95 | 100 | 100 | 100 | 108 | 100 |

*1 made by Japan Synthetic Rubber Co., Ltd., trade name, SBR #1500
*2 N-phenyl-N'-isopropyl-p-phenylenediamine
*3 N-cyclomethyl-2-benzothiazyl sulfenamide The carbon black D is small in CTAB value and large in Dm as compared with those of the invention. The carbon black E is large in CTAB and DBP values as compared with those of the invention. The carbon black F is large in DBP and Dm values as compared with those of the invention. The carbon black G is small in DBP value as compared with that of the invention. The carbon black H is large in Dm value as compared with that of the invention.

Each of the above carbon blacks was used according to a compounding recipe (part by weight) as shown in the following Table 2 to prepare a rubber composition.

The thus obtained rubber composition was used as a tread rubber to manufacture a tire having a tire size of 1000R 20 14PR. After the tire was run around stone pit and dam site scattering stones thereon over a distance of 4000-6000 km, the wear resistance and fatigue resistance (rubber cut number) of the tire were evaluated.

These evaluation were represented by an index on the basis that the tire of Comparative Example 3 was 100. The larger the index value, the better the property.

The heat build-up was represented by an index on the basis that the tire of Comparative Example 3 was 100 on results of rebound resilience tested according to BS 903: Part A8: 1963 with respect to a part of a tread taken out from a new tire. The larger the index value, the better the property.

As seen from Table 2, in the tread rubber composition for heavy duty tire according to the invention, the wear resistance and fatigue resistance can considerably be improved without damaging the low heat build-up by compounding a given amount of specified carbon black as compared with the rubber composition containing conventional carbon black.

What is claimed is:

1. A tread rubber composition for heavy duty pneumatic tire comprising 30-100 parts by weight of carbon black satisfying the following conditions:
    (1) cetyl trimethyl ammonium bromide adsorption specific surface area (CTAB) is within a range of 130-160 m²/g;
    (2) dibutylphathalate absorption (DBP) is within a range of 90-120 ml/100 g; and
    (3) average void size of aggregate (Dm) is not more than 210 Å, based on 100 parts by weight of at least one rubber component selected from natural rubber and diene series rubbers.

2. The tread rubber composition according to claim 1, wherein said synthetic rubber is selected from isoprene rubber, butadiene rubber, butyl rubber and styrene-butadiene copolymer rubber.

3. The tread rubber composition according to claim 1, wherein said DBP is within a range of 90-100 ml/100 g.

4. The tread rubber composition according to claim 1, wherein said Dm is not more than 200 Å.

* * * * *